April 12, 1966 J. L. E. BALDWIN 3,246,175

TRANSISTOR N-STABLE CIRCUIT ARRANGEMENT

Filed May 1, 1964 3 Sheets-Sheet 1

INVENTOR
JOHN LEWIS EDWIN BALDWIN
BY Hane and Nydick
ATTORNEYS

April 12, 1966 J. L. E. BALDWIN 3,246,175
TRANSISTOR N-STABLE CIRCUIT ARRANGEMENT
Filed May 1, 1964 3 Sheets-Sheet 2

INVENTOR
JOHN LEWIS EDWIN BALDWIN
BY Hane and Nydick
ATTORNEYS

TRANSISTOR N-STABLE CIRCUIT ARRANGEMENT

Filed May 1, 1964 3 Sheets-Sheet 3

INVENTOR
JOHN LEWIS EDWIN BALDWIN
BY Hane and Nydick
ATTORNEYS

3,246,175
TRANSISTOR N-STABLE CIRCUIT ARRANGEMENT

John Lewis Edwin Baldwin, Croydon, Surrey, England, assignor to Rank-Bush Murphy Limited, London, England, a British company Filed May 1, 1964, Ser. No. 364,263
Claims priority, application Great Britain, May 23, 1963, 20,601/63
10 Claims. (Cl. 307—88.5)

It is an object of the present invention to provide a multi-stable circuit arrangement which in operation has advantages as compared with known circuit arrangements.

It is a further object of the invention to provide a multi-stable circuit arrangement in which one active device only of a plurality of main active devices can at any time be in a unique predetermined stable state of conduction.

Yet another object of the invention is to provide a multi-stable circuit arrangement having advantageous characteristics when applied to control a plurality of sequentially operated gate circuits.

Specifically it is an object of the invention to provide a multi-stable circuit arrangement in which transitions from one active device to another occur symmetrically, one device being progressively cut off as another becomes conductive.

A multi-stable circuit arrangement according to the invention comprises in combination: a plurality of main active devices each comprising an input electrode, an output electrode and a common electrode and a like plurality of transfer active devices each having an input electrode, an output electrode and a common electrode. Each of the transfer devices has its output electrode connected to the output electrode of a main device and its common electrode connected to that of another main device in cyclic succession. The circuit also includes a source of direct current having first and second terminals. A resistance is connected between the common electrode of each main device and the first terminal of the current source, and an individual resistance is connected between the output electrode of each main device and the second terminal of said source. The input electrode of each main device is connected by way of an individual resistor, all of which are of equal value, with the output electrode of each other main device, whereby one only of said main devices can at any time be in a predetermined stable state of conduction. The circuit also includes a source of voltage pulses tending to make the transfer devices conductive, signal-storing circuit means coupling this pulse source to the input electrode of each transfer device and resistive means coupling each of these input electrodes to an electrode of an individual main device in circuit with which it is connected. The electrode chosen is that at which there appears, when said main device is in said predetermined unique state of conduction, a potential tending to cause said transfer device to become conductive.

In a multi-stable circuit arrangement according to the invention it will usually be convenient for the unique state of conduction of the main active devices to be the conductive state, so that one main device only can be stably conductive at any one time, while all other main devices are cut off. The inverse arrangement is possible, however, as will be shown in the description relating to the figures.

In a convenient embodiment of circuit arrangement according to the invention all the main active devices are intercoupled firstly by connecting their common electrodes together and returning them to the supply line by way of a common resistance, and secondly by connecting the input electrode of each main device to the output electrode of each other main device through a resistance and preferably though not essentially by way of a capacitor to the output electrode of a sequentially adjacent main device.

The features of the present invention which are believed to be novel are set forth with particularly in the appended claims. The invention, together with further objects and advantages thereof, may best be understood by reference to the following description taken in conjunction with the accompanying drawings, in which:

Figure 1:
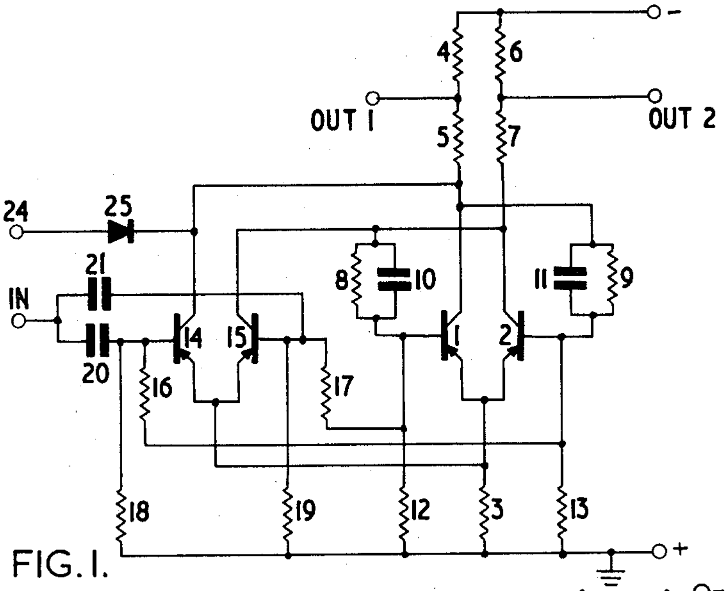
FIGURE 1 is a circuit diagram of one embodiment of bi-stable circuit arrangement according to the invention, using transistors as the active devices.

In the circuit arrangement shown in FIGURE 1, a first pair of p-n-p transistors 1, 2 have their emitters connected together and returned to a positive supply line by way of a resistor 3. Transistors 1, 2 have separate collector loads, composed respectively of resistors 4, 5 and 6, 7. Output signals may be taken from the junctions of resistors 4, 5 and 6, 7 by way of respective output terminals OUT 1 and OUT 2. The two transistors are additionally inter-coupled by the base of each being connected to the collector of the other by way of the parallel combination of a resistor 8, 9 respectively, with a capacitor 10, 11 respectively. The bases of transistors 1, 2 are also returned to the positive line by way of respective resistors 12, 13. The arrangement thus far described is a known bi-stable circuit arrangement in which one only of transistors 1, 2 can pass current at any one time. To transfer such a circuit arrangement to its alternative stable state it has been common practice to apply to the transistors an input signal such that both are momentarily cut off. Owing to the known properties of the circuit, which it is considered unnecessary to rehearse in detail, the previously non-conductive transistor will become conductive when the input signal ceases. This action is due to the storage of information in capacitors 10, 11. In a circuit arrangement employing the present invention, however, the presence of these capacitors is no longer necessary to ensure correct bi-stable operation.

A disadvantage of this known circuit arrangement in some applications is that both transistors are briefly in the same state of conduction, so that the potentials of the two output terminals are then the same. In applications in which the circuit arrangement is employed to control alternatively-open gate circuits, for example, this can be a serious disadvantage, which the present invention allows to be abolished.

In accordance with the present invention there are provided two transfer transistors 14, 15. Each of these transistors is connected from the collector of one of main transistors 1, 2 to the emitter of the other. Since the emitters of transistors 1, 2 are commoned, this means that the emitters of all four transistors are in fact connected together. The base of each of these transfer transistors is coupled to that of the main transistor to which its collector is not connected by way of a respective resistor 16, 17. The bases of transistors 14, 15 are also returned to the positive line by way of respective resistors 18, 19. Thus when the circuit arrangement is in one of its stable conditions neither of transistors 14, 15 will normally pass current. Negative-going input signals are received at an input terminal IN and are applied to the bases of transistors 14, 15 by way of like capacitors 20, 21.

Let it be assumed that transistor 1 is initially conducting and that transistor 2 is therefore cut off. When a negative-going input pulse is applied to the bases of transistors 14, 15, transistor 15 will first commence to conduct, since its base is held more negative than that of transistor 14 by reason of the resistor 17 connecting it to the base of transistor 1. As transistor 15 commences to pass current the potential at output terminal OUT 2 commences to fall, while that at terminal OUT 1 commences to rise, for as transistor 15 passes current, so does transistor 1 cease to conduct. During the persistence of the input pulse at its base, therefore, transistor 15 will continue to pass current, while the remainder of the transistors will be cut off, but transistor 2 will be so biased that at the end of the input pulse it, rather than transistor 1, will take the current flowing in resistor 3 and as the end of the input signal occurs, transistor 15 will relapse into the non-conducting state and as it does so transistor 2 will become conductive, thus establishing the desired alternative stable state.

The next input pulse which is received at terminal IN will result in an exactly similar sequence of operations in which transistor 14 will first conduct, cutting off transistor 2 and, at the end of the input pulse, transistor 1 will again become operative.

In addition there may be provided means whereby this bi-stable circuit may be set into a predetermined one of its stable conditions. Thus a positive pulse applied by way of a terminal 24 to the anode of a diode 25, of which the cathode is connected to the common collector connection of transistors 1 and 14, will cause the bi-stable circuit to assume that condition in which transistor 1 is conducting and transistor 2 is cut off.

Figure 2:
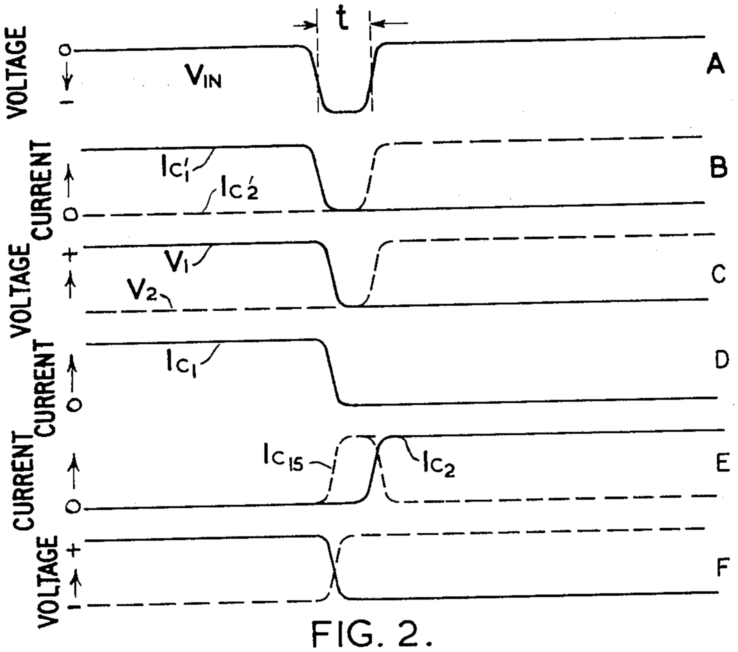
FIGURE 2 is a series of waveform diagrams illustrating the operation of a known bi-stable circuit and of a bi-stable circuit according to the present invention.

The operation of the circuit arrangement of FIGURE 1 and its advantages as compared with known bi-stable circuit arrangements will now be further explained with reference to the waveform diagrams of FIGURE 2, which are all drawn to a common time-scale and of which each represents the voltage applied to or current flowing through one or more transistors.

The diagram 2A represents the negative-going input pulse applied to a circuit arrangement as described in relation to FIGURE 1. In the absence of transfer transistors 14, 15, this input signal would be so applied as first to cause transistor 1 (assumed initially conductive) to be cut off, so that its current would fall as illustrated by waveform $I_{c'1}$ of diagram 2B. At the end of the input pulse, transistor 2 would become conductive as illustrated by the variation of its collector current represented by curve $I_{c'2}$ of diagram 2B. The disadvantage of this known arrangement is to be seen in that during the presence of the input pulse shown in diagram 2A neither transistor is conductive, so that as a result the voltage $V_1$ at output terminal OUT 1 changes from its more positive to its most negative value at a time earlier by the duration *t* of the input pulse than the time at which the voltage $V_2$ at output terminal OUT 2 changes from its most negative to its more positive value. If the output signals are used to control gating circuits, therefore, there will be a period in which neither gate circuit is open, or during which both gate circuits are open, thus giving rise to either a discontinuity or an overlap in the output signal, which can in some circumstances be very deleterious in effect.

When transfer transistors are employed in accordance with the present invention, however, at the time when transistor 1 ceases to pass collector current, as illustrated by waveform $I_{c1}$ in diagram 2D, transistor 15 commences to pass collector current as indicated by waveform $I_{c15}$ in diagram 2E. The signals appearing at the output terminals OUT 1 and OUT 2 are now shown by waveforms $V_1$ and $V_2$ respectively in diagram 2F, that is, they are exactly complementary, for transistor 15 draws its collector current through the load resistors 6, 7 of transistor 2. At the end of the input pulse transistor 15 ceases to pass current, but transistor 2 takes an exactly complementary current, illustrated by waveform $I_{c2}$ in diagram 2E, so that the voltage $V_2$ at terminal OUT 2 is undisturbed.

Figure 3:
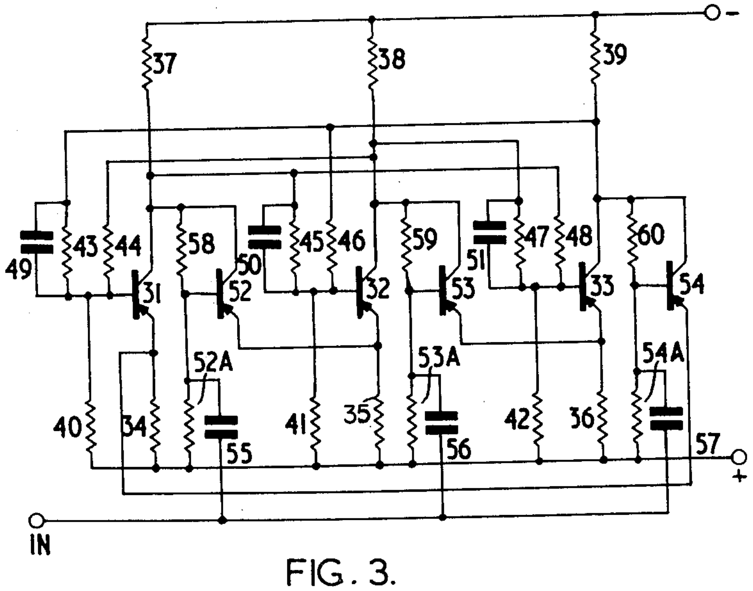
FIGURE 3 is a circuit diagram of one embodiment of a tri-stable circuit arrangement according to the invention using transistors as the active devices.

FIGURE 3 shows a tri-stable circuit arrangement incorporating the present invention. Three main transistors 31, 32, 33 have respective collector and emitter load resistors 34, 35, 36 and 37, 38, 39. The base of each of transistors 31, 32, 33 is connected to the positive supply line by way of a respective resistor 40, 41, 42 and is coupled to the collector of each of the other main transistors by way of equal resistors 43, 44; 45, 46; 47, 48 respectively. That one of these resistors which connects the base of one main transistor to the collector of a preceding sequentially adjacent transistor is shunted by a respective capacitor 49, 50, 51. These capacitors are provided to improve the speed of operation of the circuit, but in an n-stable circuit arrangement according to the invention are not essential to its correct sequential operation. Three transfer transistors 52, 53 and 54 have their collector-emitter paths connected respectively between the collector of transistor 31 and the emitter of transistor 32, the collector of transistor 32 and the emitter of transistor 33, and the collector of transistor 33 and the emitter of transistor 31. The base of each of the transfer transistors is connected to the positive line by way of a respective resistor 52A, 53A, 54A, and to an input terminal IN by way of a capacitor 55, 56, 57 and to the collector of the sequentially adjacent main transistor by way of a further resistor 58, 59, 60.

Such a circuit arrangement is tri-stable, having three conditions in which two main transistors are conductive while the third is cut off. Assume that initially transistor 31 is cut off, so that its collector assumes the most negative potential of its range. This negative potential is applied by way of resistors 45, 47 to the bases of transistors 32, 33, which are thereby turned on. The more positive potential appearing at the collector of each of transistors 32 and 33 is applied by way of resistors 43, 44 to the base of transistor 31, of which is thus held cut off. Since the potentials at the bases of transfer transistors 52–54 are determined by those at the collectors of the sequentially adjacent main transistors, the potential at the base of transistor 52 will be more negative than that at the bases of transistors 32, 33 though not in itself sufficient to allow this transistor to conduct. When a negative-going drive pulse is applied to the bases of all three transfer transistors by way of terminal IN and capacitors 55–57, transistors 52 will therefore conduct in preference to transistors 53 and 54.

When transistor 52 conducts it draws current through collector load resistor 37 of transistor 31, so that the potential at this collector goes positive. The positive-going change in potential here arising is transferred by way of resistors 45, 48 to the bases of the other main transistors 32 and 33, while the current drawn by transfer transistor 52 passes through the emitter resistor 35 of main transistor 32, thus taking the emitter of this transistor more negative at a time when its base is taken more positive. The circuit design is such that this transistor therefore becomes cut off, yielding at its collector a negative-going change in potential which is applied to the bases of main transistors 31 and 33. Transistor 33 is already conductive and remains in that condition, but transistor 31 is non-conducting, so that the change in potential on its base causes it to become conductive. At the end of the drive pulse, transfer transistor 52 ceases to conduct, leaving the circuit with main transistors 31, 33 conductive and transistor 32 cut off. The next drive pulse will cause transistor 33 to be cut off, leaving transistors 31 and 32 conductive to complete the cycle. Obviously output potentials may be taken from the collector circuits of main transistors 31–33 to control gates which are required to be opened in non-overlapping but continuous sequence, and equally obviously the number of stages may be reduced to two or increased as required.

Figure 4:
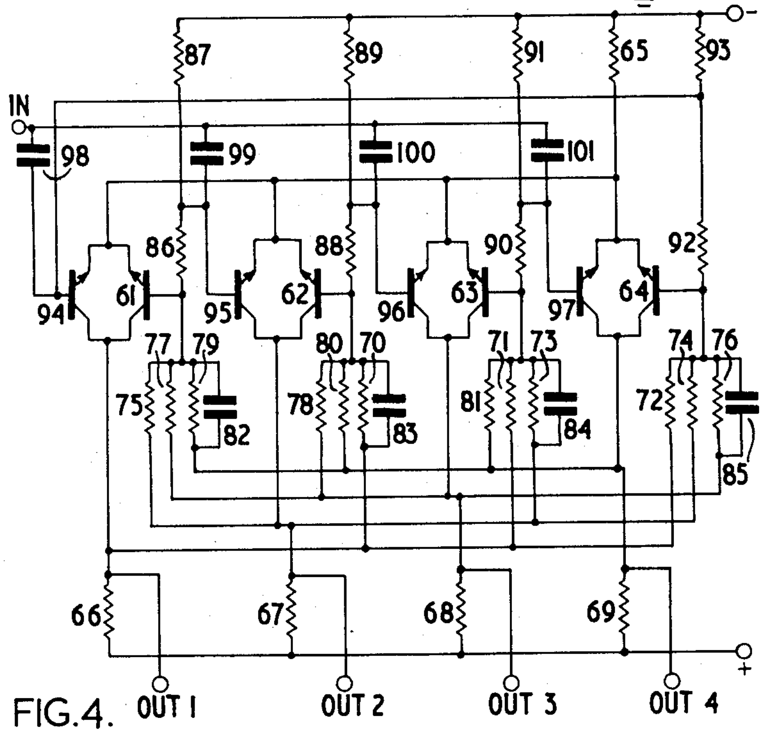
FIGURE 4 is a circuit diagram of one embodiment of a quadri-stable circuit arrangement according to the invention using transistors as the active devices.

FIGURE 4 shows the application of the invention in a quadri-stable circuit arrangement, comprising main transistors 61, 62, 63 and 64, which in this case are of the n-p-n type. The emitters of these transistors are connected together and returned to the negative supply line by way of a common resistance 65. The collector of each main transistor is returned to the positive supply line by way of an individual load resistor 66, 67, 68 and 69 respectively. The collector of each of transistors 61–64 is also connected to the bases of each of the other main transistors by way of a resistor; thus the collector of transistor 61 is connected to the base of transistors 62, 63 and 64 by way of resistors 70, 71 and 72 respectively, while the collector of transistor 62 is connected to the bases of transistors 63, 64 and 61 by way of resistors 73, 74 and 75 respectively, the collector of transistor 63 is connected to the bases of transistors 64, 61 and 62 by way of resistors 76, 77 and 78 respectively and the collector of transistor 64 is connected to the bases of transistors 61, 62 and 63 by way of resistors 79, 80 and 81 respectively. Capacitors 82, 83, 84 and 85 connected from the collector of each transistor to the base of the next in sequence are provided to improve the speed of operation but in a circuit arrangement according to the invention are not essential to the correct sequential operation of the circuit.

The base of each of main transistors 61–64 is returned to the negative supply line by way of two resistors, 86, 87; 88, 89; 90, 91 and 92, 93 respectively. A circuit arrangement as so far described is quadri-stable in that one only of main transistors 61–64 can conduct, and by symmetry this can be any one of the four. To incorporate the present invention, there is connected from the collector of each main transistor to the emitter of the next in sequence a transfer transistor. Since the emitters of all the main transistors are in fact commoned, transfer transistors 94, 95, 96 and 97 are shown as being connected in parallel with main transistors 61, 62, 63 and 64 respectively. The bases of transfer transistors 94–97 are connected respectively to the junction of the two base resistors of the sequentially adjacent main transistor, the base of transfer transistor 94 being connected to the junction of resistors 92, 93 in the base lead of main transistor 64 and so on in sequence. The base of each transfer transistor is also connected by way of a respective capacitor 98, 99, 100 or 101 to an input terminal IN at which positive-going drives pulses are received.

The collector of each main transistor is also connected to a respective output terminal OUT 1, OUT 2, OUT 3, and OUT 4, from which controlling potentials may be taken, for example, to control gate circuits of which one and only one is required to be open at all times.

The action of this circuit arrangement is exactly the same in nature as that of the bi-stable circuit described in relation to FIGURE 1. Each drive signal received at terminal IN will cause that one of transfer transistors 94–97 to conduct of which the base is at the most positive potential. This will be that transfer transistor of which the base is coupled, by way of one of resistors 86, 88, 90, 92, with the base of the main transistor which is at that time conducting.

As described in detail with reference to FIGURES 1 and 2, the action of the transfer transistors is not only to ensure the correct sequential operation of the quadri-stable circuit arrangement, but to provide at the four output terminals a sequence of potentials of which one is at all times different from the others and which appear in a sequence which is substantially without overlap or underlap. A circuit arrangement of this kind is therefore very suitable for controlling the operation of head switching in a system in which signals recorded upon magnetic tape are reproduced by a plurality of transducer heads operating in sequence.

It will be apparent to those skilled in the art that the transistor circuits hereinbefore described may be readily adapted as thermionic valve circuits, using triode valves in which the grid, cathode and anode respectively form the input, common and output electrodes of the amplifying device. One such circuit arrangement will now be described with reference to FIGURE 5.

Figure 5:
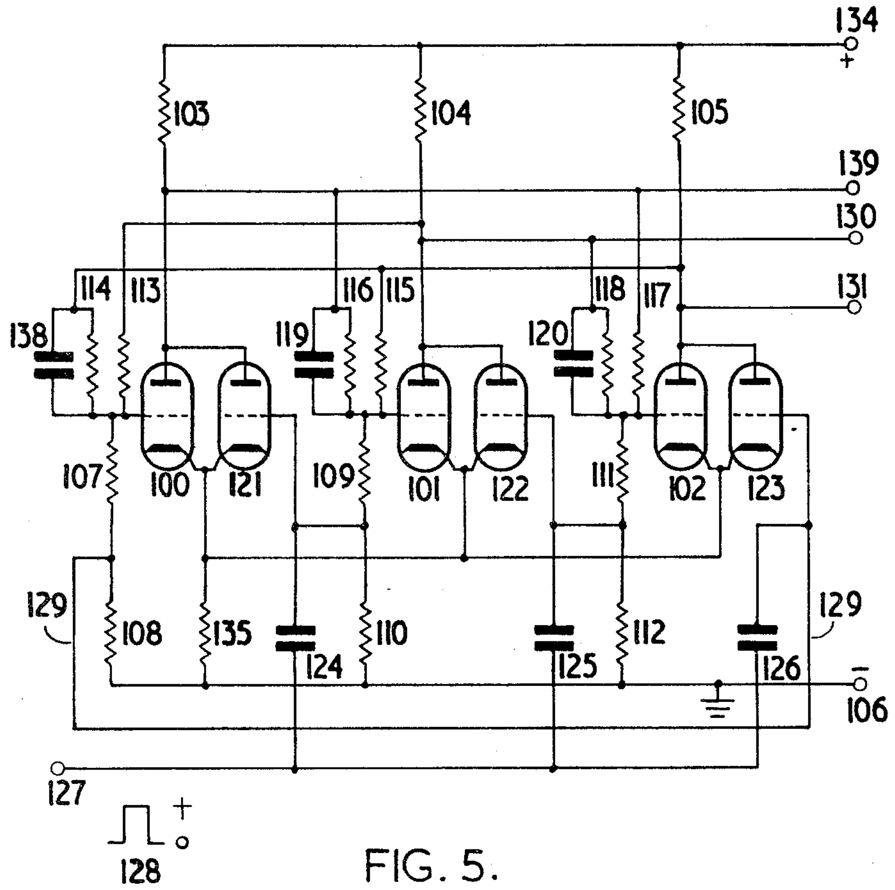
FIGURE 5 shows the circuit diagram of an embodiment of a tri-stable circuit arrangement according to the invention using thermionic valves or tubes as the active devices.

In the embodiment of the invention shown in FIGURE 5, thermionic valve or vacuum tube active devices are employed to form a tri-stable circuit arrangement. Here each of three main thermionic valves 100, 101, 102 has an individual load resistor 103, 104, 105 connected between its anode and the positive terminal 134 of a source of direct current. The cathodes of all three main thermionic valves are connected together and returned by way of a common coupling resistor 135 to the grounded negative terminal 106 of the direct current source. The grid of each of main valves 100, 101, 102 is returned to the grounded negative line by way of two series-connected resistors 107, 108; 109, 110; 111, 112 respectively, while these grids are also connected to the anodes of the other main valves by way of equal resistors 113, 114, 115, 116; 117 and 118 respectively. The anode of each main valve 100, 101, 102, is connected to the grid of another in cyclic sequence by way of capacitors. Specifically capacitor 138 connects the anode of valve 102 to the grid of valve 100, capacitor 119 connects the anode of valve 100 to the grid of valve 101 and capacitor 120 connects the anode of valve 101 to the grid of valve 102.

In accordance with the invention there are provided three transfer thermionic valves 121, 122, 123 each having its anode connected to that of a corresponding one of main valves 100–102. Specifically, transfer valve 121 has its anode connected to that of main valve 100, transfer valve 122 has its anode connected to that of main valve 101 and transfer valve 123 has its anode connected to that of main valve 102. The cathodes of all of transfer valves 121–123 are connected to the common cathode connection of main valves 100–102. The grids of all the three transfer valves 121–123 are connected by way of respective equal capacitors 124, 125, 126 to a source of positive-going voltage pulses, this source being represented in the figure only as a terminal 127. Ideally the voltage pulses applied to terminal 127 will have the form shown at 128. The grid of transfer valves 121–123 are individually connected to the junction of the grid resistors of an adjacent main valve: specifically the grid of transfer valve 121 is directly connected to the junction of resistors 109, 110, in the grid lead of main valve 101, the grid of transfer valve 122 is directly connected to the junction of resistors 111, 112 in the grid lead of main valve 102 and the grid of transfer valve 123 is directly connected by way of lead 129 with the junction of resistors 107, 108 in the grid lead of main valve 100.

The interconnections of main valves 100, 101, 102 are such that one only of these valves can at any time be in a stable state of conduction. When a main valve, for example valve 101 is in this conducting state the other main valves, that is valves 100 and 102, are cut off so that their anodes assume a more positive potential than that of valve 101. Since the grid of valve 101 is returned by way of resistors 115, 116 to the anodes of valve 100, 102, both of which are at relatively high potential, the potential of this grid is higher than that of the grids of valves 100, 102, which are returned not only by way of respective resistors 113, 118 respectively to the anode of the other of valves 100, 102, but also by way of respective resistors 114, 117 to the anode of valve 101 which is at a relatively low potential. Thus the grid of transfer valve 21, which is connected to the tapping on grid resistor 109, 110 of valve 101 is held at a more positive potential than that applied to the grids of the remaining transfer valves 122, 123. Thus when a positive pulse 128 appears at terminal 127, transfer valve 121 will be caused to pass more current than valves 122, 123. This current is drawn through load resistor 103 which is common to main valve 100 and transfer valve 121, thus producing across this resistor a voltage drop which is applied by way of capacitor 119 to the grid of main valve 101. The negative-going potential thus applied to the grid of main valve 101 causes this valve to pass less current in proportion as transfer valve 121 passes more. The amplitude of the applied voltage pulse 128 is chosen such that valve 101 becomes cut off. At the end of pulse 128 valve 121 ceases to pass current. At this time the grid potential of main valve 100 is more positive than that of the other main valves 101, 102, for this grid is returned to the anodes of valves 101, 102 which are both cut off, as are their associated transfer valves 122, 123, whereas the grids of valves 101, 102 are each returned to the anode of valve 100, the transfer valve 121 of which has been passing current, and are therefore at a lower potential. Valve 100 therefore passes current as valve 121 ceases to pass current.

It will be appreciated that as transfer valve 121 became conductive, valve 101 was cut off, so that the potentials at the anodes of valve 100, 101 changed in a complementary manner, as did the output potentials taken from terminals 129, 130 which are connected to these anodes. The same complementary change in voltage at a pair of output terminals 139, 130, 131 takes place for each drive pulse 128.

It will be appreciated that in an exactly similar manner the transistors of FIGURES 1 and 4 may be replaced by thermionic valves or vacuum tubes when this is desirable for any reason.

While particular embodiments of the invention have been shown and described, it is apparent that changes and modifications may be made without departing from the invention in its broader aspects. The aim of the appended claims, therefore, is to cover all such changes and modifications as fall within the true spirit and scope of the invention.

I claim:

1. In a multi-stable circuit arrangement, in combination: a plurality of main active devices each having an input electrode, an output electrode and a common electrode; a like plurality of transfer active devices each having an input electrode, an output electrode and a common electrode, each said transfer device having its output electrode connected to the output electrode of an individual one of said main devices and its common electrode connected to that of another of said main devices, in cyclic succession; a source of direct current having first and second terminals; a resistance connected between the common electrode of each said main device and the first terminal of said current source; individual resistors each connected between the output electrode of an individual one of said main devices and said second terminal of said current source; like resistors connecting the input electrode of each said main device with the output electrode of each other said main device, whereby one only of said main devices can at any time be in a predetermined stable state of conduction; a source of voltage pulses; a plurality of signal storing circuit means coupling said pulse source alike to the input electrode of each said transfer device; and resistive circuit means coupling the input electrode of each said transfer device to an electrode of an individual one of those said main devices to which it is connected, said electrode of said individual one of those said main devices being an electrode thereof which, when said one main device is in said predetermined state of conduction, has a potential tending to cause said transfer device to become conductive.

2. A multi-stable circuit arrangement according to claim 1 in which said active devices are transistors.

3. A multi-stable circuit arrangement according to claim 1 in which said active devices are thermionic valves.

4. In a multi-stable circuit arrangement, in combination: a plurality of main active devices each having an input electrode, an output electrode and a common electrode; a like plurality of transfer active devices each having an input electrode, an output electrode and a common electrode; a common resistor connecting the common electrodes of all said main devices to one terminal of a source of direct current, individual resistors connecting the output electrode of each said main device to the other terminal of said current source, like resistors connecting the input electrode of each said main device to the output electrode of each other of said main devices; a direct connection between the output electrode of each said transfer device and the output electrode of an individual one of said main devices; a direct connection from the common electrode of each said transfer device to the common electrode of a sequentially adjacent one of said main devices, an individual resistor connecting the input electrode of each said transfer device to the input electrode of said sequentially adjacent main device; an individual resistor connecting the input electrode of each said main device to said one terminal of said current source; a source of voltage pulses; individual capacitors connecting said pulse source alike to the input electrodes of said transfer devices; and individual capacitors connecting the output electrode of each said main device to the input electrode of said sequentially adjacent main device, whereby one only of said main devices can at any time be in a stable conductive state and whereby in response to each said pulse that one of said main devices which is then in said conductive state becomes cut off and the sequentially adjacent one of said main devices enters said stable conductive state.

5. A multi-stable circuit arrangement according to claim 4 in which said active devices are transistors.

6. A multi-stable circuit arrangement according to claim 4 in which said active devices are thermionic valves.

7. In a multi-stable circuit arrangement, in combination: a plurality of main active devices each having an input electrode, a common electrode and an output electrode; a like plurality of transfer active devices each having an input electrode, a common electrode and an output electrode; an individual resistor connecting the common electrode of each said main device to one terminal of a source of direct current; an individual resistor connecting the output electrode of each said main device to the other terminal of said current source; individual resistors connecting the input electrode of each said main device to said one terminal of said current source; individual equal resistors connecting the input electrode of each said main device to the output electrodes of each other of said main devices; individual capacitors connecting the output electrode of each said main device to the input electrode of another said main device in a predetermined sequence; a direct connection from the output electrode of each said transfer device to the output electrode of an individual one of said main devices; a direct connection from the common electrode of each said transfer device and the common electrode of a sequentially adjacent said main device; individual resistors connecting the input electrodes of said transfer devices to said one terminal of said current source; individual resistors connecting the input electrode of each said transfer device to the output electrode of that one of said main devices to which that output electrode of said transfer device is connected; a source of voltage pulses; and individual capacitors connecting said pulse source alike to the input electrodes of all said transfer devices, whereby one only of said main devices can at any time be in a stable non-conductive state and whereby in response to each said pulse that one of said devices which is then in said non-conductive state becomes conductive and the sequentially successive one of said devices is cut off.

8. A multi-stable circuit arrangement according to claim 7 in which said active devices are transistors.

9. A transistor bistable circuit comprising first and second main transistors each having a base electrode, a collector electrode and an emitter electrode and comprising also first and second transfer transistors each having a base electrode, a collector electrode and an emitter electrode; the collector electrodes of each said transfer transistor being connected to the collector electrodes of an individual one of said main transistors; individual load resistances connected between the collector electrodes of each said main transistor and the negative terminal of a direct current source, a common coupling resistance connected between the emitter electrodes of all said main transistors and said transfer transistors and the positive terminal of said source; individual resistors connecting the base electrodes of said main transistors to said positive terminal of said current source; individual direct connections between the collectors of said first and said second main and transfer transistors respectively; respective coupling circuits each comprising a resistor shunted by a capacitor, said coupling circuits being connected between the collector electrode of each said main transistor and the base electrode of the other said main transistor; individual resistors connected between the base electrode of each said transfer transistor and the base electrode of that main transistor other than that to the collector electrode of which the collector electrode of said transfer transistor is connected; a source of negative-going pulses; respective capacitors coupling said pulse source alike to the base electrode of each said transfer transistor; and individual resistors connecting the base electrodes of each said transfer transistor to said positive terminal of said current source.

10. A transistor quadri-stable circuit arrangement comprising, in combination; first, second, third and fourth main n-p-n transistors each having a base electrode, a collector electrode and an emitter electrode; a source of direct current having positive and negative terminals; an individual series combination of two joined resistors connecting the base electrode of each said main transistor to said positive terminal of said current source; said combination having a tapping point at the junction of said resistors; an individual resistor connecting said base electrode of each said main transistor to the collector electrode of each other of said main transistor; an individual capacitor connecting said base electrode of each said main transistor to the collector electrode of an individual other one of said main transistors in order; an individual resistor connecting the collector electrode of each said main transistor to the positive terminal of said current source; a common emitter connection to said emitter electrodes of all said main transistors, a single resistor connected between said common emitter connection and said negative terminal of said current source; first, second, third and fourth n-p-n transfer transistors each having a base electrode, a collector electrode and an emitter electrode; an individual direct connection from said collector electrode of each said transfer transistor to the collector electrode of said main transistors of like order; a direct connection from the emitter electrode of each said transfer transistor to said common emitter connection of said main transistors; an individual direct connection from said base electrode of each said transfer transistor to said tapping point of that one of said series combinations of resistors which is connected to the base electrode of said main transistors next higher in order to said transfer transistor; a source of voltage pulses tending to cause said transfer transistors to conduct; and individual capacitors connecting said base electrode of each said transfer transistor to said pulse source.

No references cited.

ARTHUR GAUSS, *Primary Examiner.*

S. D. MILLER, *Assistant Examiner.*